US012705958B2

(12) United States Patent
Barkan et al.

(10) Patent No.: US 12,705,958 B2
(45) Date of Patent: Aug. 11, 2026

(54) BARCODE READER AND SCALE ASSEMBLY

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/524,245

(22) Filed: Nov. 30, 2023

(65) Prior Publication Data

US 2025/0182593 A1 Jun. 5, 2025

(51) Int. Cl.
*G07G 1/00* (2006.01)

(52) U.S. Cl.
CPC ......... *G07G 1/0072* (2013.01); *G07G 1/0018* (2013.01)

(58) Field of Classification Search
CPC ........................... G07G 1/0072; G07G 1/0018
USPC .......................................................... 235/383
See application file for complete search history.

(56) References Cited

U.S. PATENT DOCUMENTS 5,929,390 A 7/1999 Naito et al.
2007/0113650 A1* 5/2007 Fellinger .................. G01N 9/36 73/441
2009/0194595 A1 8/2009 Gregerson
2013/0056285 A1* 3/2013 Meagher ................ G01G 23/02 177/1
2013/0175341 A1* 7/2013 Kearney .............. G06K 7/1096 235/440
2013/0328682 A1* 12/2013 Shearin ................ G06K 7/1096 235/462.43
2014/0172607 A1* 6/2014 Skiles ................ G01G 19/4144 705/16
2021/0190580 A1 6/2021 Barkan et al.
2021/0294999 A1* 9/2021 Drzymala .............. H04N 23/54
2023/0004734 A1* 1/2023 Sieckowski ........ G06K 7/10861
2023/0169285 A1* 6/2023 Handshaw ......... G06K 7/10722 235/462.43

(Continued)

OTHER PUBLICATIONS

International Search Report and Written Opinion for International Patent Application No. PCT/US2024/057485 mailed on Jan. 27, 2025.

*Primary Examiner* — Allyson N Trail

(57) ABSTRACT

An example bioptic barcode reader assembly includes a barcode reader, a metal frame secured to a housing of the barcode reader, and a scale assembly positioned between the barcode reader and the metal frame. The scale assembly has a load cell, a stationary frame secured to the metal frame and fixedly mounted on a first end of the load cell, a movable load arm fixedly mounted on a second end of the load cell, a platter removably positioned on the load arm, and an electrical circuit configured to provide power to the platter. The electrical circuit follows a weigh path of the load cell and includes a first end portion adjacent the stationary frame, a middle portion having at least a portion fixedly secured to the load cell, and a second end portion having at least a portion fixedly secured to the movable load arm.

24 Claims, 8 Drawing Sheets

(56) References Cited

U.S. PATENT DOCUMENTS

| | | | | |
|---|---|---|---|---|
| 2023/0274249 | A1 * | 8/2023 | Astvatsaturov ...... | G06K 7/1413<br>705/23 |
| 2024/0428030 | A1 * | 12/2024 | Barkan ................ | G06K 7/1443 |

* cited by examiner

BARCODE READER AND SCALE ASSEMBLY

BACKGROUND

Typical barcode reader assemblies and scale assemblies used with barcode reader assemblies do not provide directed power and/or communications with the platter due to the difficulty of providing and electrical connection to the platter without disturbing the weighing accuracy of the scale assembly or making the platter difficult to remove for cleaning/maintenance. However, it could beneficial to be able to provide power and/or communications directly to the platter for various reasons, such as the provision of scanner upgrade module cameras, end of platter vision cameras, off-platter detection systems, user indicators located in the platter, in-platter wakeup systems; in-platter displays, etc.

SUMMARY

In an embodiment, the present invention is a barcode reader assembly comprising a barcode reader, a metal frame secured to a housing of the barcode reader, and a scale assembly positioned between the barcode reader and the metal frame. The scale assembly comprises a load cell, a stationary frame secured to the metal frame and fixedly mounted on a first end of the load cell, a movable load arm fixedly mounted on a second end of the load cell, opposite the first end, a platter removably positioned on the load arm, and an electrical circuit configured to provide power to the platter. The electrical circuit is positioned to follow a weigh path of the load cell and comprises a first end portion located adjacent the stationary frame, a middle portion having at least a portion fixedly secured to the load cell, and a second end portion having at least a portion fixedly secured to the movable load arm.

In a variation of this embodiment, at least a portion of the first end portion of the electrical circuit is fixedly secured to the stationary frame.

In another variation of this embodiment, the barcode reader is a bioptic barcode reader.

In another variation of this embodiment, the electrical circuit is configured to provide an electrical connection between electronics on opposite sides of the load cell.

In another variation of this embodiment, the platter is not restrained in a vertical direction.

In another variation of this embodiment, the middle portion of the electrical circuit is flexible.

In another variation of this embodiment, the electrical circuit comprises at least one of a flex circuit or a plurality of wires.

In another variation of this embodiment, the electrical circuit extends between the stationary frame and the load cell at the first end of the load cell across an area that the stationary frame is fixedly mounted to the load cell and extends between the movable load arm and the load cell at the second end of the load cell across an area that the movable load arm is fixedly mounted to the load cell.

In another variation of this embodiment, the middle portion of the electrical circuit extends longitudinally along and is at least partially secured to a top surface of the load cell, between the load cell and the movable load arm.

In another variation of this embodiment, the middle portion of the electrical circuit extends longitudinally along and is at least partially secured to a bottom surface of the load cell, between the load cell and the stationary frame.

In another variation of this embodiment, the middle portion of the electrical circuit extends longitudinally along and is at least partially secured to a side surface of the load cell.

In another variation of this embodiment, the second end portion of the electrical circuit has an unsecured electrical connector configured to provide an electrical connection between the electrical circuit and the platter.

In another variation of this embodiment, the first end portion of the electrical circuit has secure electrical connector configured to provide an electrical connection between the electrical circuit and a power source.

In another variation of this embodiment, a resolution of the load cell measures in about 0.02 pound increments In another embodiment, the present invention is a scale assembly comprising a load cell, a stationary frame fixedly mounted on a first end of the load cell, a movable load arm fixedly mounted on a second end of the load cell, opposite the first end, a platter removably positioned on the load arm, and an electrical circuit configured to provide power to the platter. The electrical circuit is positioned to follow a weigh path of the load cell and comprises a first end portion located adjacent the stationary frame, a middle portion having at least a portion fixedly secured to the load cell, and a second end portion having at least a portion fixedly secured to the movable load arm.

In a variation of this embodiment, the first end portion of the electrical circuit has at least a portion fixedly secured to the stationary frame.

In another variation of this embodiment, the platter is not restrained in a vertical direction.

In another variation of this embodiment, the middle portion of the electrical circuit is flexible.

In another variation of this embodiment, the electrical circuit comprises at least one of a flex circuit or a plurality of wires.

In another variation of this embodiment, the electrical circuit extends between the stationary frame and the load cell at the first end of the load cell across an area that the stationary frame is fixedly mounted to the load cell and extends between the movable load arm and the load cell at the second end of the load cell across an area that the movable load arm is fixedly mounted to the load cell.

In another variation of this embodiment, the middle portion of the electrical circuit extends longitudinally along and is at least partially secured to a top surface of the load cell, between the load cell and the movable load arm.

In another variation of this embodiment, the middle portion of the electrical circuit extends longitudinally along and is at least partially secured to a bottom surface of the load cell, between the load cell and the stationary frame.

In another variation of this embodiment, the middle portion of the electrical circuit extends longitudinally along and is at least partially secured to a side surface of the load cell.

In another variation of this embodiment, the second end portion of the electrical circuit has an unsecured electrical connector configured to provide an electrical connection between the electrical circuit and the platter.

In another variation of this embodiment, the first end portion of the electrical circuit has secure electrical connector configured to provide an electrical connection between the electrical circuit and a power source.

In another variation of this embodiment, a resolution of the load cell measures in about 0.02 pound increments.

In another embodiment, the present invention is a scale assembly comprising a load cell, a stationary frame fixedly mounted on a first end of the load cell, a movable load arm fixedly mounted on a second end of the load cell, opposite the first end, and an electrical circuit configured to provide an electrical connection between electronics on opposite sides of the load cell. The electrical circuit is positioned to follow a weigh path of the load cell.

In a variation of this embodiment, the electrical circuit comprises a first end portion located adjacent the stationary frame, a middle portion having at least a portion fixedly secured to the load cell, and a second end portion having at least a portion fixedly secured to the movable load arm.

In another variation of this embodiment, the first end portion of the electrical circuit has at least a portion fixedly secured to the stationary frame.

In another variation of this embodiment, the middle portion of the electrical circuit is flexible.

In another variation of this embodiment, the electrical circuit comprises at least one of a flex circuit or a plurality of wires.

In another variation of this embodiment, the electrical circuit extends between the stationary frame and the load cell at the first end of the load cell across an area that the stationary frame is fixedly mounted to the load cell and extends between the movable load arm and the load cell at the second end of the load cell across an area that the movable load arm is fixedly mounted to the load cell.

In another variation of this embodiment, a middle portion of the electrical circuit extends longitudinally along and is at least partially secured to a top surface of the load cell, between the load cell and the movable load arm.

In another variation of this embodiment, a middle portion of the electrical circuit extends longitudinally along and is at least partially secured to a bottom surface of the load cell, between the load cell and the stationary frame.

In another variation of this embodiment, a middle portion of the electrical circuit extends longitudinally along and is at least partially secured to a side surface of the load cell.

In another variation of this embodiment, the second end portion of the electrical circuit has an unsecured electrical connector configured to provide an electrical connection between the electrical circuit and a platter.

In another variation of this embodiment, the first end portion of the electrical circuit has secure electrical connector configured to provide an electrical connection between the electrical circuit and a power source.

In another variation of this embodiment, a resolution of the load cell measures in about 0.02 pound increments.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
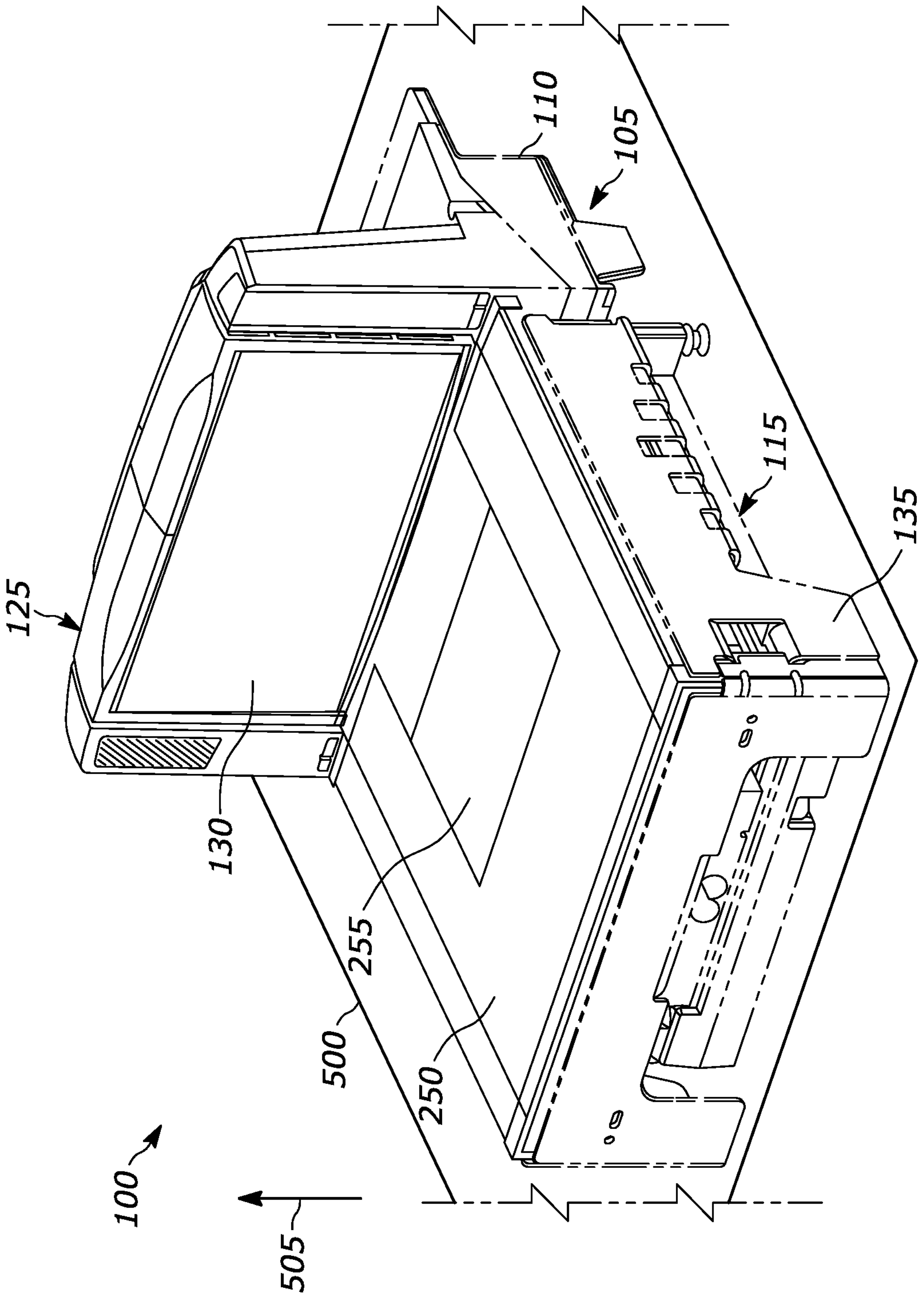
FIG. 1 illustrates a front perspective view of an example barcode reader assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example barcode reader assembly and scale assemblies disclosed herein utilized an electrical circuit, such as a flex circuit, to provide power and/or communications to the platter of the scale assembly, which can be used for various systems, such as scanner upgrade module cameras, end of platter vision cameras, off-platter detection systems, user indicators in the platter, in-platter wakeup systems, in-platter displays, etc. The electrical circuits disclosed herein follow the weigh path across the load cell, which allows the electrical circuit to pass across the strain relief region of the scale without impacting the weight reading. The electrical circuit is fixedly secured to solid regions of the components of the scale assembly, but could be left unsecured with some relief across the load cell, in order not to impact the weight reading. In addition, while a scanner side of the electrical circuit could have a secure electrical connector, the platter side of the electrical circuit has an unsecured electrical connector, such as contact pads, leaf springs, pogos, etc., to accept the connection to the platter having electronics inside while not throwing off the weight or prevent the platter removal for cleaning/maintenance.

Figure 2:
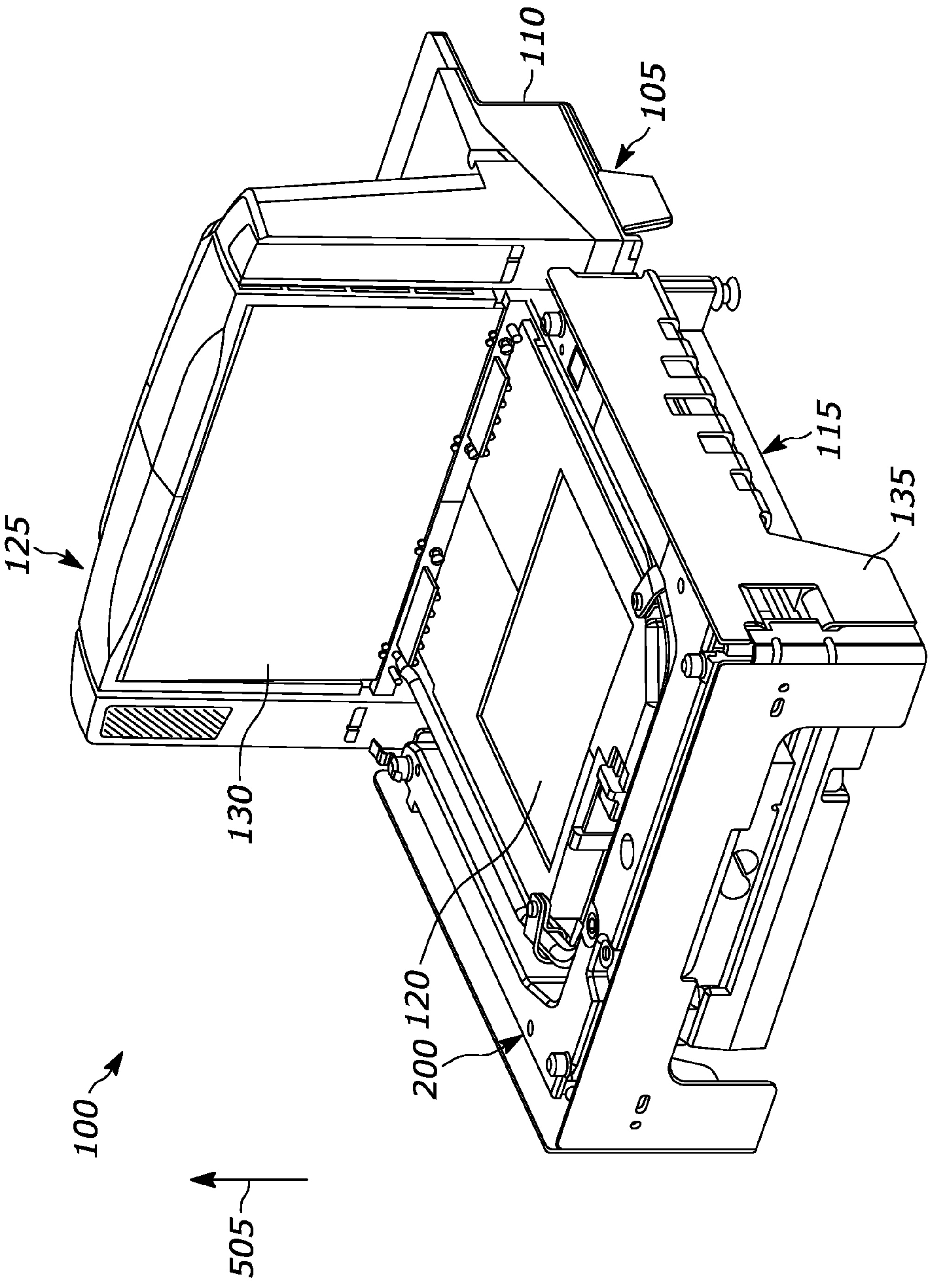
FIG. 2 illustrates the barcode reader assembly of FIG. 1 with the platter removed.

Referring to FIGS. 1 and 2, an example barcode reader assembly 100 is shown that can be configured to be supported by a workstation 500, such as a checkout counter at a POS of a retail store. Barcode reader assembly 100 generally includes a barcode reader 105, a metal frame 135 secured to a housing 110 of the barcode reader 105, and a scale assembly 200 positioned between barcode reader 105 and metal frame 135. In the example shown, barcode reader 105 is a bioptic barcode reader, such as the Zebra® MP7200 bioptic barcode reader, and housing 110 of barcode reader 105 can include a lower housing portion 115 and an upper housing portion 125 that extends above lower housing portion 115. A generally horizontal window 120 can be positioned in lower housing portion 115 to allow a set of optical components positioned within housing 110 to direct at least a portion of a FOV through horizontal window 120 and a generally upright window 130 can be positioned in upper housing portion 125 to allow the set of optical components to direct at least a portion of a FOV through upright window 130. The fields-of-view directed through horizontal window 120 and upright window 130 intersect to define a product scanning region, where an object can be scanned for sale at the POS.

Figure 3:
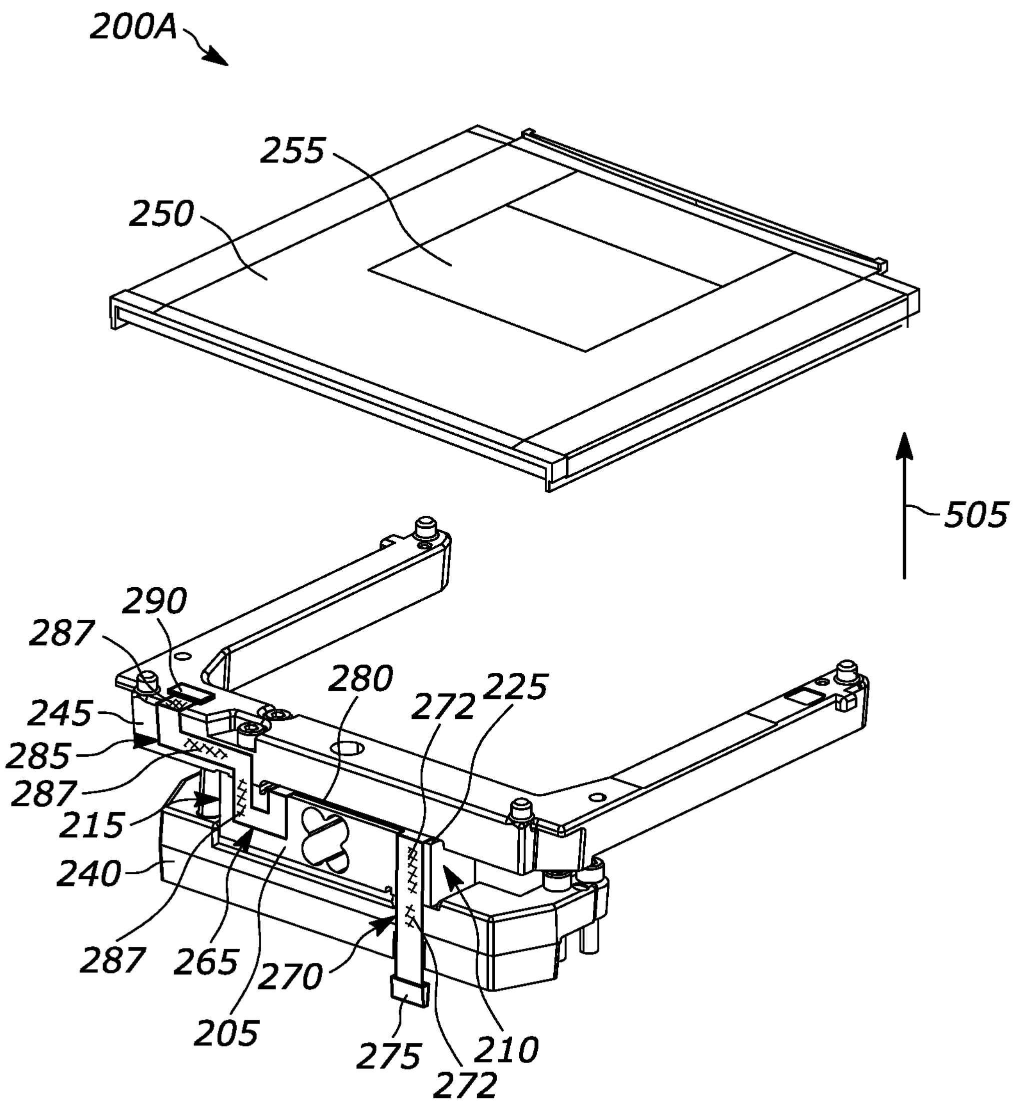
FIG. 3 illustrates a partially exploded front perspective view of a first example scale assembly for use in the barcode reader assembly of FIG. 1.
Figure 4:
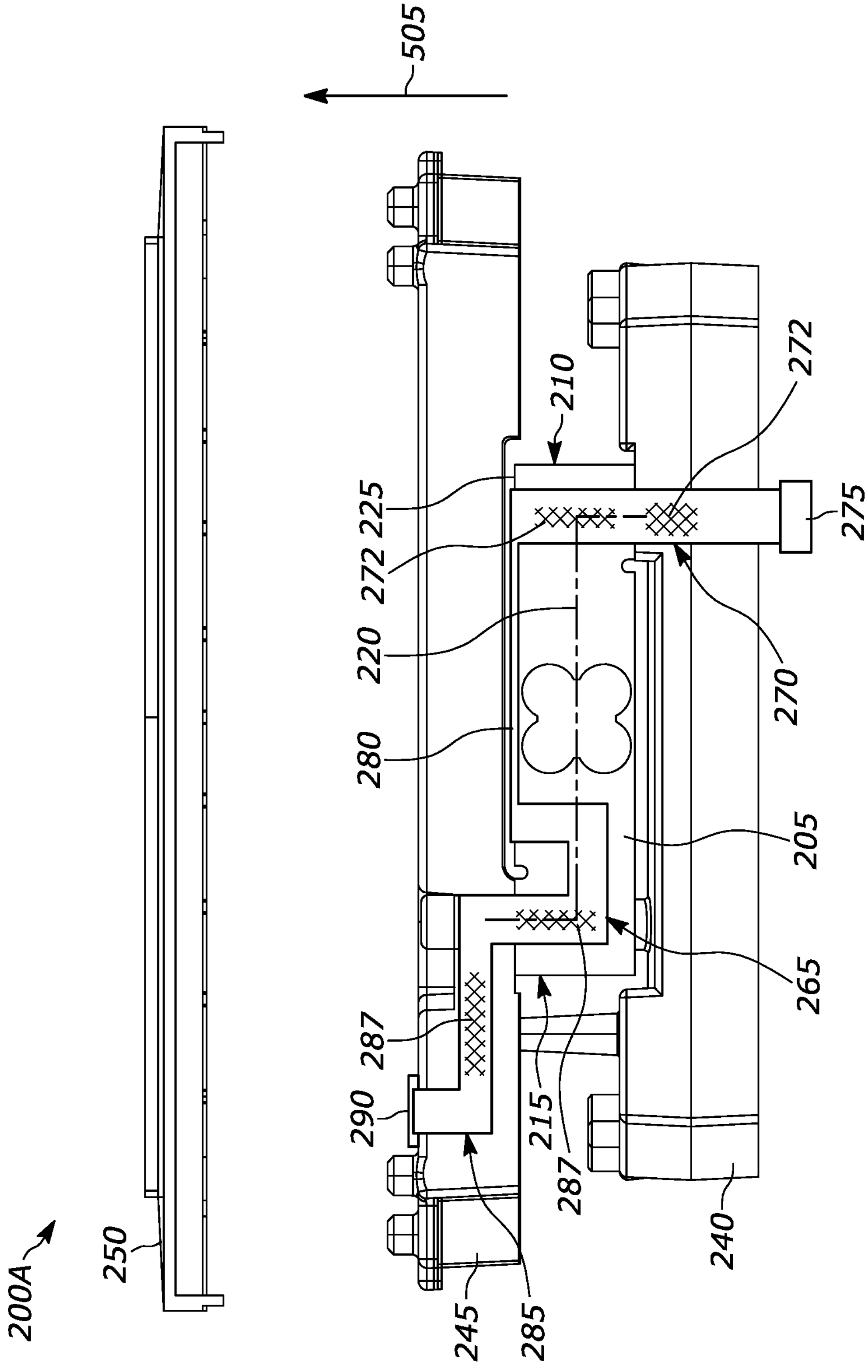
FIG. 4 illustrates a front view of the scale assembly of FIG. 3.

Referring to FIGS. 3-4, a first embodiment of scale assembly 200, designated 200A, is illustrated, which generally includes a load cell 205, a stationary frame 240 that can be secured to metal frame 135, a movable load arm 245, a platter 250 removably positioned on load arm 245, and an electrical circuit 265 that is configured to provide power to platter 250. In the example shown, scale assembly 200A is illustrated as having a single load cell 205 that preferably has a resolution that measures in about 0.02 pound increments. However, scale assembly 200A can have any number of load cells desired, such as individual load cells positioned at each corner of movable load arm 245. Platter 250 includes a generally horizontal window 255 that is generally aligned with horizontal window 120 of barcode reader 105 and is not connected or attached to load arm 245 so that platter 250 is not restrained in a vertical direction (indicated by arrow 505), which allows for easy removal of platter 250 for maintenance, cleaning, etc. In addition, platter 250 could include an upright frame (not shown) and a generally upright window (not shown) that could be generally aligned with upright window 130 of barcode reader 105.

Stationary frame 240 is fixedly mounted on a first end 210 of load cell 205 (e.g., with threaded members that extend through holes in stationary frame 240 and are threaded into threaded holes in first end 210 of load cell 205) and movable load arm 245 is fixedly mounted on a second end 215 of load cell 205, opposite first end 210 (e.g., with threaded members that extend through holes in movable load arm 245 and are threaded into threaded holes in second end 215 of load cell 205). Secured in this manner, a weigh path 220 of load cell 205 is defined laterally through the area where stationary frame 240 is fixedly mounted to load cell 205, longitudinally through load cell 205, and laterally through the area where movable load arm 245 is fixedly secured to load cell 205.

Electrical circuit 265 is configured to provide an electrical connection between electronics on opposite sides of load cell 205. For example, electrical circuit 265 can be configured to provide power to platter 250 and provide an electrical connection between platter 250 on one side of load cell 205 and a power source (not shown) on an opposite side of load cell 205. Electrical circuit 265 can be a flex circuit, a plurality of wires, etc., and has a first end portion 270 that located or positioned adjacent stationary frame 240 and extends between stationary frame 240 and load cell 205, a second end portion 285 that is located or positioned adjacent movable load arm 245 and extends between movable load arm 245 and load cell 205, and a middle portion 280 between first end portion 270 and second end portion 285. Preferably, middle portion 280 of electrical circuit 265 is flexible.

Electrical circuit 265 is positioned to follow weigh path 220 of load cell 205 to avoid electrical circuit 265 affecting the weighing accuracy of scale assembly 200A. First end portion 270 of electrical circuit 265 extends between stationary frame 240 and load cell 205 at first end 210 of load cell 205 across the area that stationary frame 240 is fixedly mounted to load cell 205. First end portion 270 has a secure electrical connector 275 (e.g., a Zero Insertion Force (ZIF) connector) that is configured to provide an electrical connection between electrical circuit 265 and a power source (not shown) and, if desired, at least a portion 272 of first end portion 270 can be fixedly secured (e.g., adhered) to stationary frame 240 and/or to load cell 205. Second end portion 285 of electrical circuit 265 extends between movable load arm 245 and load cell 205 at second end 215 of load cell 205 across the area that movable load arm 245 is fixedly mounted to load cell 205. Second end portion 285 has an unsecured electrical connector 290 (e.g., contact pad(s), leaf spring(s), pogo pin(s), etc.) that is configured to provide an electrical connection between electrical circuit 265 and platter 250, preferably through a corresponding unsecured electrical connector located on the underside of platter 250. At least a portion 287 of second end portion 285 is fixedly secured (e.g., adhered) to movable load arm 245 and can be fixedly secured (e.g., adhered) to load cell 205. Providing second end portion 285 with unsecured electrical connector 290 allows electrical circuit 265 to electrically connect with platter 250 without affecting weight reading and also allows the removal of platter 250 for cleaning/maintenance without restraining platter 250 in the vertical direction.

In the example shown, middle portion 280 of electrical circuit 265 has at least a portion 282 that extends longitudinally along a top surface 225 of load cell 205, between load cell 205 and movable load arm 245. Portion 282 of middle portion 280 can be fixedly secured (e.g., adhered) to top surface 225 along the entire length of portion 282. Alternatively, sections of portion 282 can be fixedly secured to top surface 225, preferably with strain relief loops between the secured sections.

Figure 5:
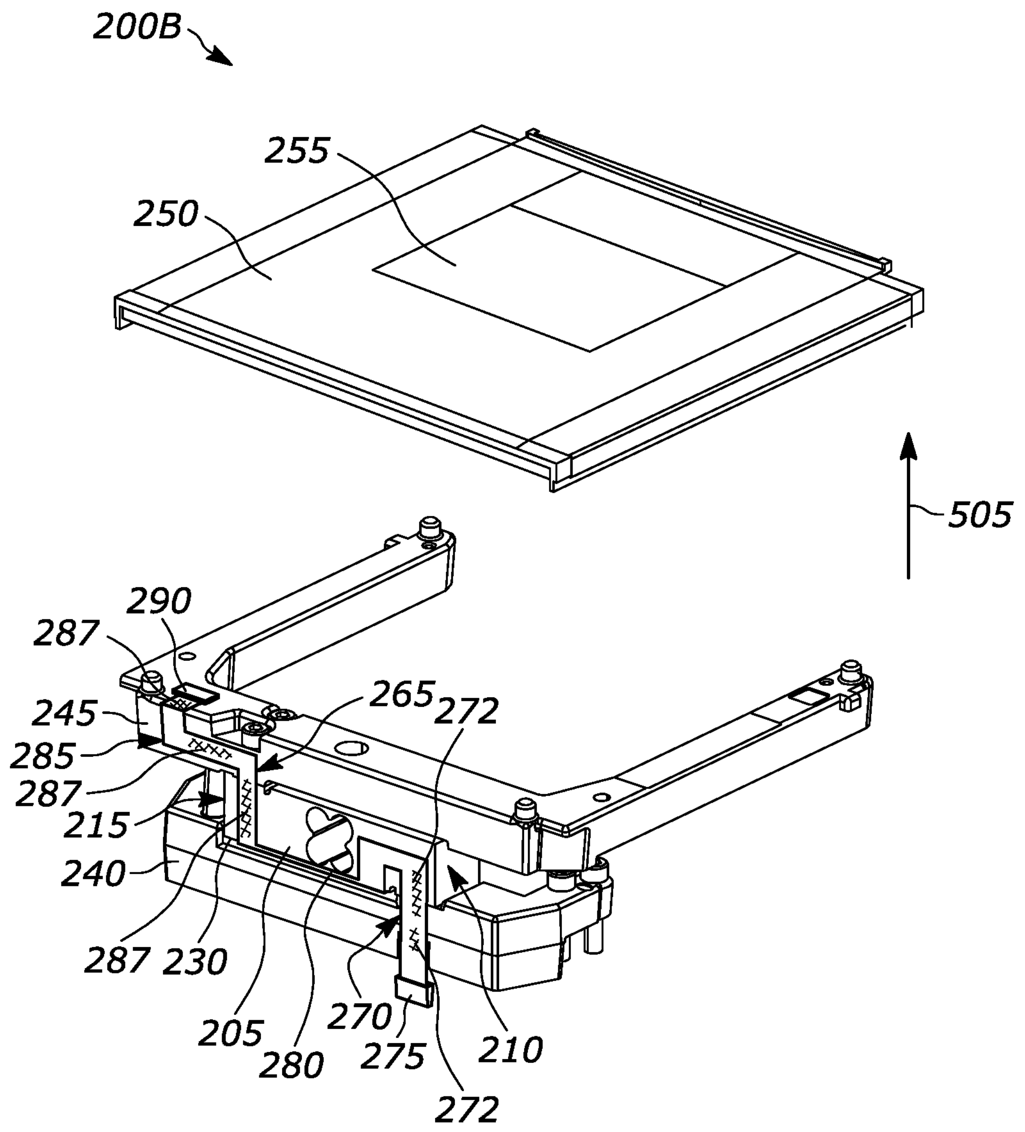
FIG. 5 illustrates a partially exploded front perspective view of a second example scale assembly for use in the barcode reader assembly of FIG. 1.
Figure 6:
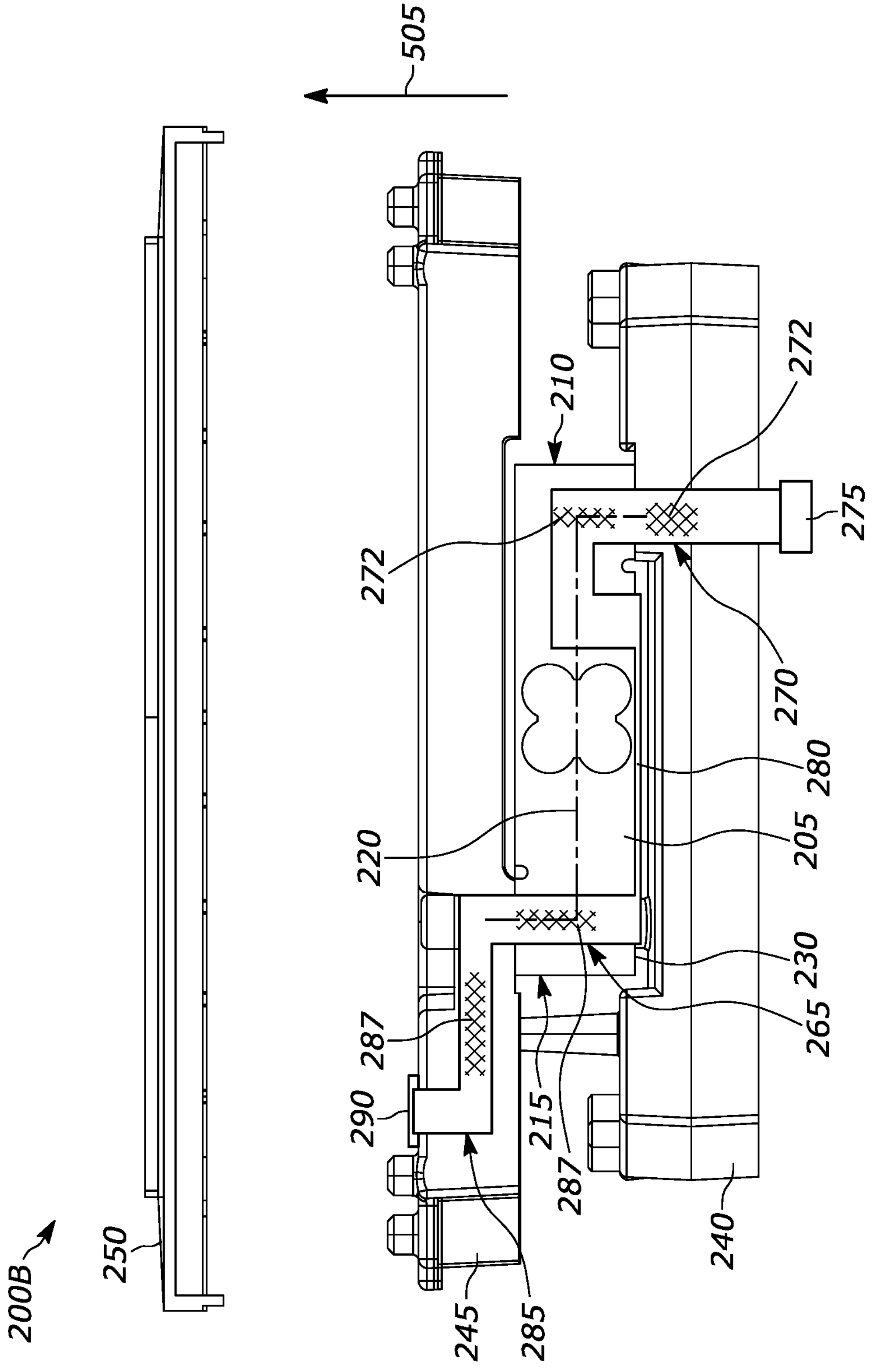
FIG. 6 illustrates a front view of the scale assembly of FIG. 5.

Referring to FIGS. 5-6, a second embodiment of scale assembly 200, designated 200B, is illustrated. Scale assembly 200B is the same as scale assembly 200A described above, except that middle portion 280 of electrical circuit 265 in scale assembly 200B has at least a portion 282 that extends longitudinally along a bottom surface 230 of load cell 205, between load cell 205 and stationary frame 240. In scale assembly 200B, portion 282 of middle portion 280 can be fixedly secured (e.g., adhered) to bottom surface 230 along the entire length of portion 282. Alternatively, sections of portion 282 can be fixedly secured to bottom surface 230, preferably with strain relief loops between the secured sections.

Figure 7:
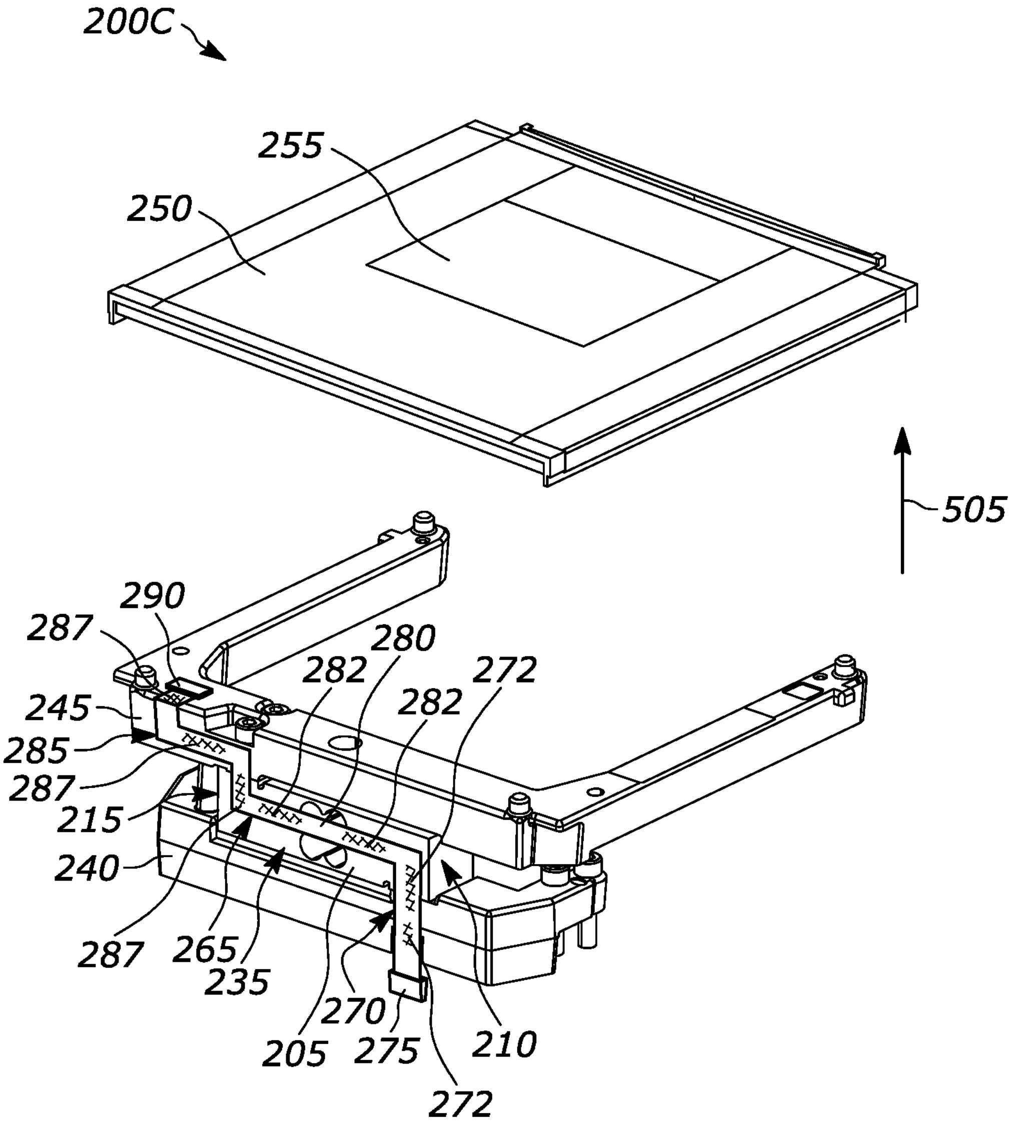
FIG. 7 illustrates a partially exploded front perspective view of a third example scale assembly for use in the barcode reader assembly of FIG. 1.
Figure 8:
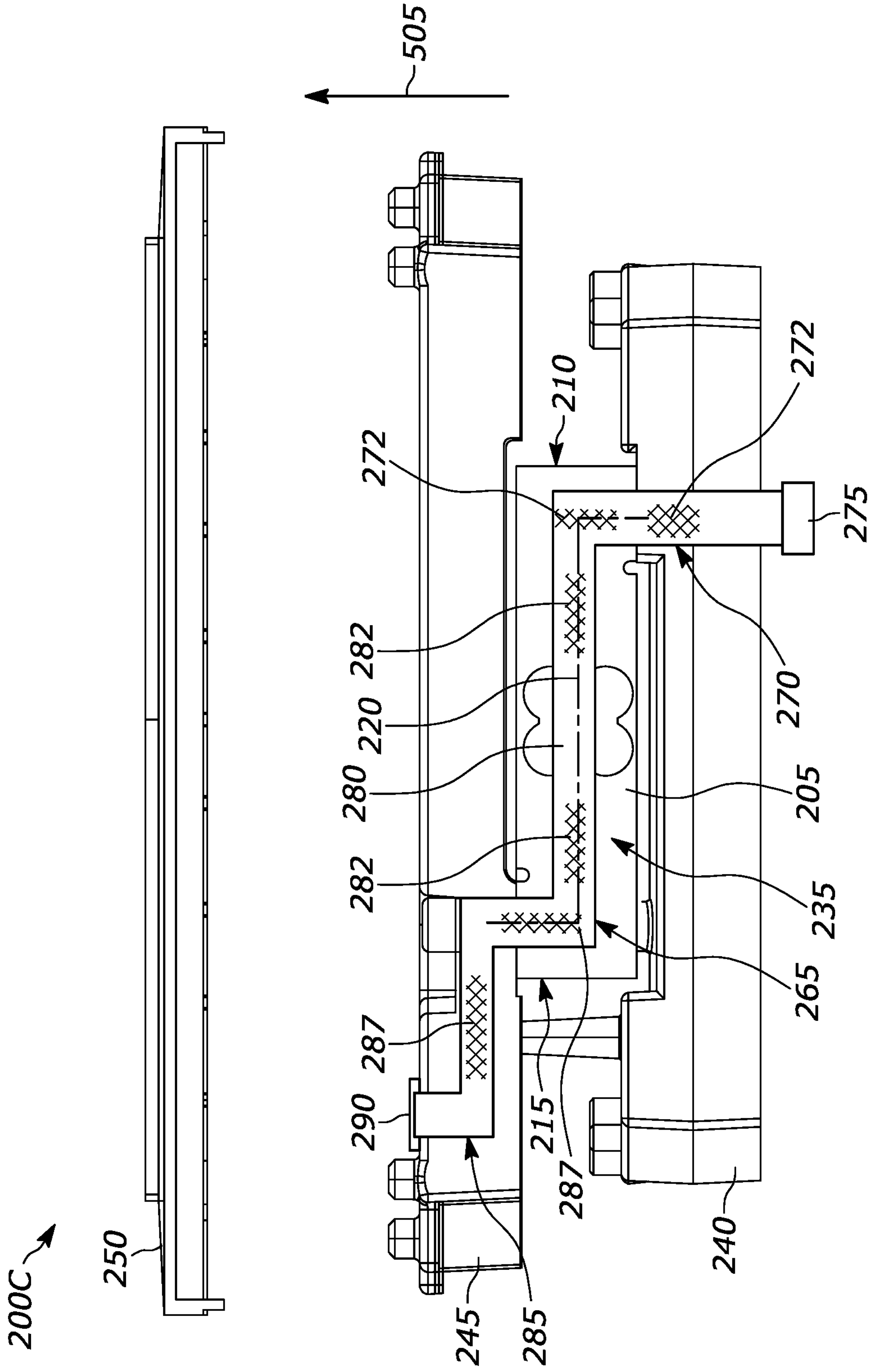
FIG. 8 illustrates a front view of the scale assembly of FIG. 7.

Referring to FIGS. 7-8, a third embodiment of scale assembly 200, designated 200C, is illustrated. Scale assembly 200C is the same as scale assembly 200A described above, except that middle portion 280 of electrical circuit 265 in scale assembly 200C has at least a portion 282 that extends longitudinally along a side surface 235 of load cell 205. In the example shown, side surface 235 is a front surface of load cell 205, extending between top surface 225 and bottom surface 230. Alternatively, side surface 235 could also be a rear surface of load cell 205. In scale assembly 200C, portion 282 of middle portion 280 can be fixedly secured (e.g., adhered) to side surface 235 along the entire length of portion 282. Alternatively, sections of portion 282 can be fixedly secured to side surface 235, preferably with strain relief loops between the secured sections.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader assembly, comprising:
- a barcode reader;
- a metal frame secured to a housing of the barcode reader; and
- a scale assembly positioned between the barcode reader and the metal frame, the scale assembly comprising:
  - a load cell;
  - a stationary frame secured to the metal frame and fixedly mounted on a first end of the load cell;

- a movable load arm fixedly mounted on a second end of the load cell, opposite the first end;
  - a platter removably positioned on the movable load arm; and
  - an electrical circuit configured to provide power to the platter, the electrical circuit positioned to follow a weigh path of the load cell and comprising a first end portion located adjacent the stationary frame, a middle portion having at least a portion fixedly secured to the load cell, and a second end portion having at least a portion fixedly secured to the movable load arm, wherein the electrical circuit extends between the stationary frame and the load cell at the first end of the load cell across an area that the stationary frame is fixedly mounted to the load cell and extends between the movable load arm and the load cell at the second end of the load cell across an area that the movable load arm is fixedly mounted to the load cell.

2. The barcode reader assembly of claim 1, wherein at least a portion of the first end portion of the electrical circuit is fixedly secured to the stationary frame.

3. The barcode reader assembly of claim 1, wherein the barcode reader is a bioptic barcode reader.

4. The barcode reader assembly of claim 1, wherein the electrical circuit is configured to provide an electrical connection between electronics on opposite sides of the load cell.

5. The barcode reader assembly of claim 1, wherein the platter is not restrained in a vertical direction.

6. The barcode reader of claim 1, wherein the middle portion of the electrical circuit is flexible.

7. The barcode reader assembly of claim 1, wherein the electrical circuit comprises at least one of a flex circuit or a plurality of wires.

8. The barcode reader assembly of claim 1, wherein the middle portion of the electrical circuit extends longitudinally along and is at least partially secured to a top surface of the load cell, between the load cell and the movable load arm.

9. The barcode reader assembly of claim 1, wherein the middle portion of the electrical circuit extends longitudinally along and is at least partially secured to a bottom surface of the load cell, between the load cell and the stationary frame.

10. The barcode reader assembly of claim 1, wherein the middle portion of the electrical circuit extends longitudinally along and is at least partially secured to a side surface of the load cell.

11. The barcode reader assembly of claim 1, wherein the second end portion of the electrical circuit has an unsecured electrical connector configured to provide an electrical connection between the electrical circuit and the platter.

12. The barcode reader assembly of claim 1, wherein the first end portion of the electrical circuit has secure electrical connector configured to provide an electrical connection between the electrical circuit and a power source.

13. The barcode reader assembly of claim 1, wherein a resolution of the load cell measures in about 0.02 pound increments.

14. A scale assembly, comprising:
- a load cell;
- a stationary frame fixedly mounted on a first end of the load cell;
- a movable load arm fixedly mounted on a second end of the load cell, opposite the first end;
- a platter removably positioned on the movable load arm; and an electrical circuit configured to provide power to the platter, the electrical circuit positioned to follow a weigh path of the load cell and comprising a first end portion located adjacent the stationary frame, a middle portion having at least a portion fixedly secured to the load cell, and a second end portion having at least a portion fixedly secured to the movable load arm, wherein the electrical circuit extends between the stationary frame and the load cell at the first end of the load cell across an area that the stationary frame is fixedly mounted to the load cell and extends between the movable load arm and the load cell at the second end of the load cell across an area that the movable load arm is fixedly mounted to the load cell.

15. The scale assembly of claim 14, wherein the first end portion of the electrical circuit has at least a portion fixedly secured to the stationary frame.

16. The scale assembly of claim 14, wherein the platter is not restrained in a vertical direction.

17. The scale assembly of claim 14, wherein the middle portion of the electrical circuit is flexible.

18. The scale assembly of claim 14, wherein the electrical circuit comprises at least one of a flex circuit or a plurality of wires.

19. The scale assembly of claim 14, wherein the middle portion of the electrical circuit extends longitudinally along and is at least partially secured to a top surface of the load cell, between the load cell and the movable load arm.

20. The scale assembly of claim 14, wherein the middle portion of the electrical circuit extends longitudinally along and is at least partially secured to a bottom surface of the load cell, between the load cell and the stationary frame.

21. The scale assembly of claim 14, wherein the middle portion of the electrical circuit extends longitudinally along and is at least partially secured to a side surface of the load cell.

22. The scale assembly of claim 14, wherein the second end portion of the electrical circuit has an unsecured electrical connector configured to provide an electrical connection between the electrical circuit and the platter.

23. The scale assembly of claim 14, wherein the first end portion of the electrical circuit has secure electrical connector configured to provide an electrical connection between the electrical circuit and a power source.

24. The scale assembly of claim 14, wherein a resolution of the load cell measures in about 0.02 pound increments.

* * * * *